United States Patent
Yoon et al.

(10) Patent No.: US 8,153,543 B2
(45) Date of Patent: Apr. 10, 2012

(54) METHOD FOR PREPARING COMPOSITES OF ZEOLITE-FIBER SUBSTRATE

(75) Inventors: Kyung Byung Yoon, Seoul (KR); Jin Seok Lee, Seoul (KR); Nak-Cheon Jeong, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 770 days.

(21) Appl. No.: 11/577,196

(22) PCT Filed: Oct. 27, 2005

(86) PCT No.: PCT/KR2005/003594
§ 371 (c)(1),
(2), (4) Date: Dec. 2, 2008

(87) PCT Pub. No.: WO2006/046837
PCT Pub. Date: May 4, 2006

(65) Prior Publication Data
US 2009/0101492 A1    Apr. 23, 2009

(30) Foreign Application Priority Data

Oct. 27, 2004  (KR) .................. 10-2004-0086048

(51) Int. Cl.
*B01J 29/06* (2006.01)
(52) U.S. Cl. ........... 502/60; 502/62; 502/63; 502/64; 502/67; 502/69; 502/71; 502/74; 502/77; 502/79
(58) Field of Classification Search ............ 502/60, 502/62, 63, 64, 67, 69, 71, 74, 77, 79
See application file for complete search history.

(56) References Cited

U.S. PATENT DOCUMENTS

| | | | |
|---|---|---|---|
| 4,525,410 A | 6/1985 | Hagiwara et al. | |
| 6,607,994 B2 | 8/2003 | Soane et al. | |

FOREIGN PATENT DOCUMENTS

| | | |
|---|---|---|
| WO | 98/55679 A1 | 12/1998 |
| WO | 01/96106 A1 | 12/2001 |

*Primary Examiner* — Elizabeth Wood
(74) *Attorney, Agent, or Firm* — The Nath Law Group; Jerald L. Meyer; Tanya E. Harkins

(57) ABSTRACT

A method for preparing a composite of zeolite-fiber substrate includes the steps of reacting a fiber substrate or a zeolite with a linking compound to form an intermediate of linking compound-fiber substrate or zeolite-linking compound, and preparing the composite of zeolite-linking compound-fiber substrate by linking the intermediate of linking compound-fiber substrate to the fiber substrate or linking the intermediate of zeolite-linking compound to the zeolite, in which the linking is induced by sonication.

40 Claims, 9 Drawing Sheets

METHOD FOR PREPARING COMPOSITES OF ZEOLITE-FIBER SUBSTRATE

CROSS-REFERENCES TO RELATED APPLICATIONS

This is a US National Stage of International Application PCT/KR2005/003594, filed Oct. 27, 2005, and published May 4, 2006, as International Publication WO 2006/046837 A1, the entire contents of which are incorporated herein by reference; and the benefit of priority is claimed to Republic of Korea Patent Application No. 10-2004-0086048, filed Oct. 27, 2004, and published May 3, 2006, as Korean Unexamined Publication 10-2006-0036971 B1, the entire contents of which are also incorporated herein by reference.

BACKGROUND

1. Field

The present invention relates to a method for preparing a composite of zeolite-tethering fiber substrate, particularly, to a method for forming a zeolite layer on s fiber substrate by use of sonication process.

2. Related Art

Zeolite is a generic name of crystalline aluminosilicate, which constitutes the pore skeleton of zeolite molecules and bears an anionic charge for each aluminum atom. Cations for offsetting such anion charges are present within the pore space and the remaining pore space is filled with water. Where zeolite is heated for a given period of time at 200-300° C., anions or water molecules are released, rendering it to accept other molecules into its pores. Such acceptance ability allows zeolite to have size selectivity or shape selectivity to certain molecules and thus zeolite is referred to as a molecular sieve.

Zeotype molecular sieves generated by replacing a portion or all of silicon (Si) and/or aluminum (Al) atoms of a zeolite molecule are also widely used in the industrial field. For example, zeotype molecular sieves in which anions are replaced with metal atoms serve as a catalyst for cracking petroleum. Besides, zeolites and zeotype molecular sieves have been reported to be useful as adsorbent, water-absorbing agent, gas-purifying agent, additives for detergent, ion exchanger, soil improving agent and carrier for sensor.

Zeolites and zeotype molecular sieves generally exist as fine powders. For practical application, it has been extensively studied that fine powders of zeolites or zeotype molecular sieves are attached to the surface of substrates such as glass, ceramic, polymer and metal.

As the simplest approach, it has been suggested that zeolite particles are attached to substrates via physical interaction by immersing substrates into the suspension containing zeolite crystals (L. C. Boudreau, J. A. Kuck, M. Tsapatsis, *J. Membr. Sci.*, 152:41-59 (1999)). Since this attempt is to control the dispersion of zeolite particles by adjusting the rate of taking zeolites out of the suspension, zeolite particles are unlikely to form an even monolayer and likely to be detached from substrates due to their merely physical adsorption to substrates.

In addition, the method using compounds carrying at their both ends methyldimethoxysilyl groups ($Me(MeO)_2Si^{-1}$) as spacers for zeolite-substrate linkages has been suggested (Z. Li, C. Lai, T. E. Mallouk, *Inorg. Chem.*, 28:178-182 (1989)). According to this report, one methyldimethoxysilyl group of the spacer is initially attached to substrates and the resultant is then mixed with zeolite particles to induce covalent linkages between the other methyldimethoxysilyl group and zeolite particles. Even though this method shows higher attachment strength than that of the simplest immersion-involving method, the orientation of zeolite particles cannot be controlled and two methyldimethoxysilyl groups of the spacer are found to be attached to substrates, which interferes the formation of linkages between substrates and zeolite particles.

It has been reported that linkages between substrates and zeolites can be formed via multi-ionic bonds (L. C. Boudreau, J. A. Kuck, M. Tsapatsis, *J. Membr. Sci.*, 152, 41-59 (1999)). Aminopropylgroups bound covalently on the surface of substrates are treated with hydrochloric acid to charge the surface with cations by ammonium ions and then treated with sodium polystyrene sulfate to convert charge of the surface to anions. Thin films of zeolites are prepared by repeating the two steps. However, such preparatory process requires at least six steps, and results in somewhat poor arrangement of zeolites and poor binding strength.

Moreover, it has been suggested that nuclei of zeolite particles are generated onto substrates and grown to directly synthesize zeolite films on the surface of substrates (J. C. Jansen, D. Kashchiev, A. Erdem-Senatalar, *Stud. Surf. Catal.*, 85:215-250 (1994)). However, such attempt has limitations and shortcomings in the senses that it necessitates unchangeable substrate under conditions for zeolite synthesis and is unable to control the thickness of zeolite monolayer.

Thin films of zeolite could be also synthesized by immersing fibers as a substrate into a gel for zeolite synthesis (J. C. Jansen, D. Kashchiev, A. Erdem-Senatalar, *Stud. Surf. Catal.*, 85:215-250 (1994)). Such approach generally produces non-flexible products, inducing the detachment of zeolites from fibers when bended or folded.

In recent, zeolites and zeotype molecular sieves has been researched as innovative materials following accomplishment of the synthesis of nano-scaled zeolites (G. A. Ozin, A. Kuperman, A. Stein, *Angew. Chem. Int. Ed. Engl. Adv. Mater.* 28:359 (1989)). Particularly, zeolites have been studied to be applied as a host for a three-dimensional memory material (G. A. Ozin, A. Stein, G. D. Stucky, J. P. Godber, *J. Inclusion Phenom.* 6:379 (1990)), a light energy storage device (M. Borja, P. K. Dutta, *Nature* 362:43 (1993)); M. Sykora, J. R. Kincaid, *Nature* 387:162 (1997)); Y. Kim et al., *J. Phys. Chem.* 101:2491 (1997)), a nanoelectrode (D. R. Rolison, C. A. Bessel, *Acc. Chem. Res.* 33:737 (2000)), a quantum beam or point of semiconductor (N. Herron et al., *J. Am. Chem. Soc.* 111:530 (1989)), a molecular circuit (T. Bein, P. Enzel, *Angew. Chem. Int. Ed. Engl.* 12:1737 (1989)), a photograph-sensitive device (G. Grubert, M. Stockenhuber, O. P. Tkachenko, M. Wark, *Chem. Mater.* 14:2458 (2002)), a luminant (G. Calzaferri et al., *J. Mater. Chem.* 12:1 (2002)), a nonlinear optical material (S. D. Cox, T. E. Gier, G. D. Stucky, J. Bierlein, *J. Am. Chem. Soc.* 110:2986 (1988)) or a laser luminant (U. Vietze et al., *Phys. Rev. Lett.* 81:4628 (1998)).

In order to find application of zeolites and zeotype molecular sieves as innovative material and to overcome shortcomings associated with conventional linking approaches described previously, the present inventors have already suggested assembly methods in which nano- or micro-scaled zeolite particles are organized into uniformly aligned, two- or three-dimensional compact structures (zeolite supercrystals) (A. Kulak, Y.-J. Lee, Y. S. Park, K. B. Yoon, *Angew. Chem. Int. Ed.* 39:950 (2000); S. Y. Choi, Y.-J. Lee, Y. S. Park, K. Ha, K. B. Yoon, *J. Am. Chem. Soc.* 122:5201 (2000); A. Kulak, Y. S. Park, Y.-J. Lee, Y. S. Chun, K. Ha, K. B. Yoon, *J. Am. Chem. Soc.* 122: 9308 (2000); G. S. Lee, Y.-J. Lee, K. Ha, K. B. Yoon, *Tetrahedron* 56:6965 (2000); K. Ha, Y.-J. Lee, H. J. Lee, K. B. Yoon, *Adv. Mater.* 12:1114 (2000); K. Ha, Y.-J. Lee, D.-Y. Jung, J. H. Lee, K. B. Yoon, *Adv. Mater.* 12: 1614 (2000); G. S. Lee, Y.-J. Lee, K. B. Yoon, *J. Am. Chem. Soc.* 123:9769

(2001); K. Ha, Y.-J. Lee, Y. S. Chun, Y. S. Park, G. S. Lee, K. B. Yoon, *Adv. Mater.* 13:594 (2001); G. S. Lee, Y.-J. Lee, K. Ha, K. B. Yoon, *Adv. Mater.* 13:1491 (2001); Y. S. Chun, K. Ha, Y.-J. Lee, J. S. Lee, H. S. Kim, Y. S. Park, K. B. Yoon, *Chem. Comm.* 17:1846 (2002); J. S. Park, G. S. Lee, Y.-J. Lee, Y. S. Park, K. B. Yoon, *J. Am. Chem. Soc.* 124:13366 (2002); J. S. Park, Y.-J. Lee, K. B. Yoon, *J. Am. Chem. Soc.* 126:1934 (2004); K. Ha, J. S. Park, K. S. Oh, Y. S. Zhou, Y. S. Chun, Y.-J. Lee, K. B. Yoon, *Micropor. Mesopor. Mater.* 72:91 (2004)). Furthermore, the present inventors have developed a complex comprising mono- or multi-layered zeolites linked to substrates and its preparation method (see International Application PCT/KR2000/001002, published Dec. 20, 2001, as WO 2001/096106 A1, the entire contents of which are incorporated herein by reference).

In addition to this, the inventors have developed a method for producing a thin film composite of a fiber substrate-molecular sieve in accordance with refluxing procedure using natural fibers such as cellulose, cotton, hemp and linen having hydroxyl groups on their surface (see Korean Pat. Appln. No. 10-2001-0008926, filed with the Korean Intellectual Property Office Feb. 22, 2001, and now registered as Korean Pat. No. 10-0583349, published May 25, 2006, the entire contents of which are incorporated herein by reference).

The two patent documents disclose processes for forming a multi-layered film of molecular sieves onto substrates in which: (1) a covalent-linked substrate-linker (intermediate 1) and a covalent-linked zeolite-linker (intermediate 2) are linked via functional groups at the ends of linkers; (2) substrates or zeolites are directly attached to one terminal of linkers covalently bound to substrates or zeolites via their other terminal, (3) a middle linker is incorporated between the intermediates 1 and 2 to adjust the length between substrates and zeolites, and (4) repeating steps described (1)-(3) to form multi-layered film of molecular sieves on substrates. Although such processes contribute to applicability of substrate-molecular size composites as innovative materials, the refluxing step for linking between substrates and linkers, zeolite crystals and linkers, linkers and linkers, or linkers and intervening linkers gives rise to lower energy efficiency, attachment rate, degree of lateral close packing (DCP) between zeolite crystals and strength of linkage between zeolites and substrates. Because the refluxing process requires different approaches depending on the type of functional groups and physical properties of a substrate surface, the previous methods have disadvantages in terms of mass production.

Meanwhile, metal ions such as silver ($Ag^+$), copper ($Cu^+$, $Cu^{2+}$) and zinc ($Zn^{2+}$) ions have been reported to have antibiotic activity as per se or in aqueous form. The metal ions are able to be introduced into sites of cations within zeolites. The metal ions within zeolite pores exhibit improved durability compared to free ions. When practically used, zeolites are merely mixed with the melted form of thermoplastic polymer having lower transition temperature and extruded into a fiber form (U.S. Pat. No. 4,525,410, incorporated herein by reference). However, such method is very likely to elicit poor exposure of zeolite surface, resulting in lower bacteriolytic and bacteriostatic activity. Moreover, this method has limitations in light of the type of substrates since natural fibers such as cellulose, cotton, hemp and linen cannot be melted.

Throughout this application, various patents and publications are referenced and citations are provided in parentheses. The disclosure of these patents and publications are hereby incorporated by reference into this application in their entities, in order to more fully describe this invention and the state of the art to which this invention pertains.

SUMMARY

To be free from shortcomings of existing technologies described above, the present inventors have made intensive research and a result, discovered that sonication-involved processes for preparing composites of zeolite-fiber substrate resulted in a successful mass production of composites of zeolite-fiber substrate exhibiting significantly improved attachment rate and strength, degree of coverage (DOC) and density of coverage in a time- and energy-saving manner.

Accordingly, it is an object of this invention to provide a novel process for preparing a composite of zeolite-tethering fiber substrate.

Other objects and advantages of the present invention will become apparent from the detailed description to follow and together with the appended claims and drawings.

BRIEF DESCRIPTION OF THE DRAWINGS

FIGS. 2(A) and 2(C) represent cotton and FIGS. 2(B) and 2(D) represent ramie. FIGS. 2(C) and 2(D) are SEM (Scanning Electronic Microscope) images of FIGS. 2(A) and 2(B), respectively.

FIGS. 3(A) and 3(C) represent polyester and FIGS. 3(B) and 3(D) represent silk. FIGS. 3(C) and 3(D) are SEM images of FIGS. 3(A) and 3(B), respectively.

FIGS. 4(A), 4(B) and 4(C) represent the conventional reflux for 1 hour, 1.5 hours and 2 hours, respectively and FIG. 4(D) the present sonication method for 1 minute.

FIG. 5(A) shows thermogravimetric curves of zeolite-tethering fiber substrates and FIG. 5(B) shows magnifying curves of a 500-700° C. section of FIG. 5(A), demonstrating that the present method employing sonication (2.05%) allows a larger amount of nanosized silver ion-containing zeolites to be bound to deeper sites of fiber substrates compared with the simple refluxing method (1.5%).

FIG. 6(A) is a SEM image of the zeolite-tethering fiber substrate and FIG. 6(B) is the result of elemental analysis for the selected region of FIG. 6(A). The results demonstrate that fibers with linked zeolites containing silver ions prepared by the present sonication comprise carbon (C), oxygen (O) and silicon (Si) and silver (Ag).

FIG. 8(A) is a digital photograph under fluorescent lighting and FIG. 8(B) is a digital photograph under ultraviolet light having a wavelength of 365 nm. Fiber substrates pertaining to nanosized zeolite Y with no dye (1), nanosized zeolite Y containing pyronin Y (2), zeolite Y mixture (3) including nanosized zeolite Y containing pyronin Y and nanosized zeolite Y containing POPOP, and nanosized zeolite Y containing POPOP (4) are illustrated in FIGS. 8(A) and 8(B).

DETAILED DESCRIPTION

Figure 1A:
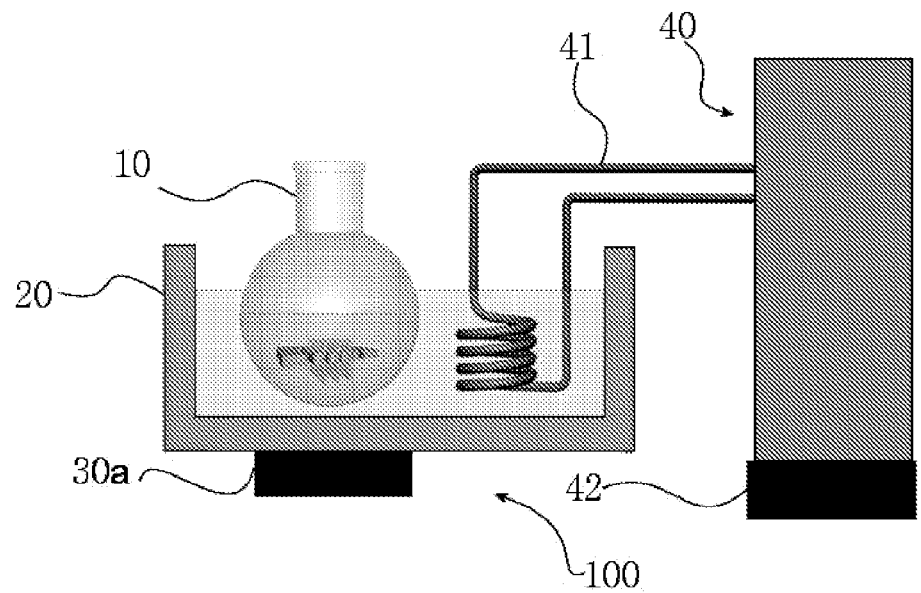
FIG. 1(A) depicts a general construction of an apparatus (100) for preparing zeolite-tethering fiber substrate by use of sonication process, which includes a reactor (10) containing solvent 1 and reactants, an external container (20) containing solvent 2 and accommodating the reactor, an ultrasound generator (30a) and a temperature controller (40). The temperature controller (40) includes a generator of cooling water (41) and a circulation coil (42).

In one aspect of this invention, there is provided a method for preparing a composite of zeolite-fiber substrate, which includes reacting a fiber substrate or a zeolite with a linking compound to form an intermediate of (linking compound-fiber substrate) or (zeolite-linking compound); and preparing the composite of (zeolite-linking compound-fiber substrate) by linking the intermediate of (linking compound-fiber substrate) to the fiber substrate or linking the intermediate of (zeolite-linking compound) to the zeolite, in which the linking is induced by sonication.

In another aspect of this invention, there is provided a method for preparing a composite of zeolite-fiber substrate, which includes reacting a fiber substrate with a linking compound to form an intermediate of (linking compound-fiber substrate); reacting a zeolite with a linking compound to form an intermediate of (zeolite-linking compound); and preparing the composite of (zeolite-linking compound-fiber substrate) by linking the intermediate of (linking compound-fiber substrate) to the intermediate of (zeolite-linking compound), in which the linking is induced by sonication.

In still another aspect of this invention, there is provided a method for preparing a composite of zeolite-fiber substrate, which includes reacting a fiber substrate with a linking compound to form an intermediate of (linking compound-fiber substrate); reacting a zeolite with a linking compound to form an intermediate of (zeolite-linking compound); and preparing the composite of (zeolite-linking compound-intervening linking compound-linking compound-fiber substrate) by linking the terminal of the linking compound in the intermediate of (linking compound-fiber substrate) to one terminal of an intervening linking compound and then linking the terminal of the linking compound in the intermediate of (zeolite-linking compound) to the other terminal of the intervening linking compound, in which the linking is induced by sonication.

In a further aspect of this invention, there is provided a method for preparing a composite of zeolite-fiber substrate, which includes sonicating a mixture of a fiber substrate, a linking compound and a zeolite to form the composite of (zeolite-linking compound-fiber substrate).

A main concept underlying the present invention is to employ a sonication process instead of a simple refluxing method conventional in the art for linking zeolites to fiber substrates, contributing to a successful mass production of composites of zeolite-fiber substrate exhibiting significantly improved attachment rate and strength, degree of coverage (DOC, defined as the percentage of the attached amount of zeolites to fiber with respect to the maximum attached amount) and density of coverage in a time- and energy-saving manner.

The term "fiber substrate" used herein refers to natural or synthetic fibers having functional groups (preferably, a hydroxyl group) well known to one skilled in the art. In particular, the fiber substrate includes:

1. Natural Fiber (1) Cellulose-based fiber such as cotton, kapok, linen, ramie, hemp, jute, sisal, coir, starch (amylase or amylopectin) and lignin.

(2) Protein-based fiber such as sheep wool, goat hair, cashmere hair, alpaca, vicuna wool, lama wool, silk, cultivated silk and tussah silk.

2. Synthetic Fiber (1) Semi-synthetic fiber such as acetate-based fiber and triacetate-based fiber (2) Synthetic fiber including (i) condensation polymerized fiber such as polyamide fiber (nylon), polyester fiber, polyurethane fiber, (ii) addition polymerized fiber such as polyethylene fiber, polyvinyl chloride fiber, polyvinylidene chloride fiber, polyfluoroethylene fiber, polyvinyl alcohol fiber, polyacrylo nitrile fiber and polypropylene fiber.

The term "zeolite" used herein refers to a broad-sense zeolite including zeotype materials. The term includes not only porous crystalline aluminosilicate of alkaline or alkaline earth metals, but also various zeotype molecular sieves in which a part or all of silicon (Si) and/or aluminum (Al) atoms constituting the structural skeleton of zeolite molecule are replaced with other elements. Most broadly, the term means all porous oxides or sulfides having hydroxyl groups on their surface. Atoms forming molecular sieves may be transition elements such as titanium, vanadium, zirconium, manganese, chromium, iron, cobalt, nickel, copper and zinc as well as main group elements such as silicon, aluminum, gallium, boron, phosphorous, oxygen and sulfur. The type of cations incorporated into pores or cations derived from a ship-in-a-bottle technique does not restrict the broadness of zeolites useful in the present invention.

Non-limiting examples of zeolites suitable in this invention are as follows:

(i) natural and synthetic zeolites;

(ii) zeolites having MFI structure and their analogues (ZSM-5, silicalite-1, TS-1 or metalo-silicalite-1 with partially substituted transition metals);

(iii) zeolites having MEL structure and their analogues (ZSM-11, silicalite-2, TS-2 or metalo-silicalite-2 with partially substituted transition metals);

(iv) zeolites (A), X, Y, L, beta, modenite, perialite, ETS-4 or ETS-10;

(v) mesoporous silica (MCM series, SBA series, MSU series and KIT series);

(vi) other zeolites and zeotype molecular sieves (including mesoporous silica) generated through hydrothermal synthesis;

(vii) organic-inorganic complexed mesoporous structure and laminate; and (viii) nanoporous materials known as organic zeolite, organic metal zeolite or coordinate compound zeolite in which metal ions and ligands are combined in a three-dimensional configuration to form nanopores.

The term "linking compound" used herein means any compound capable of mediating the linkages between zeolites and fiber substrates, having a functional group at its terminal. Preferably, the linking compound is selected from the group consisting of compounds represented by the following formulas 1-7:

| | |
|---|---|
| Z-L1-X | Formula 1 |
| MR'$_4$ | Formula 2 |
| R$_3$Si-L1-Y | Formula 3 |
| HS-L1-X | Formula 4 |
| HS-L1-SiR$_3$ | Formula 5 |
| HS-L1-Y | Formula 6 |
| Z-L2(+)L3(−)—Y or Z-L3(−)L2(+)—Y | Formula 7 | in which, Z is R$_3$Si or isocyanate (—NCO); R is halogen, $C_1$-$C_4$ alkoxy or $C_1$-$C_4$ alkyl and at least one of three Rs is halogen or alkoxy; L1 is a substituted or non-substituted $C_1$-$C_{17}$ alkyl, aralkyl or aryl and may contain one or more oxygen, nitrogen or sulfur atoms; X is halogen, isocyanate (—NCO), tosyl or azide; R' is halogen, $C_1$-$C_4$ alkoxy or $C_1$-$C_4$ alkyl and at least two of four R's is halogen or alkoxy; M is silicon, titanium or zirconium; Y is hydroxyl, thiol, amine, ammonium, sulfone or its salt, carboxylic acid or its salt, acid anhydride, epoxy, aldehyde, ester, acryl, isocyanate (—NCO), sugar residue, double bond, triple bond, diene, diyne, alkyl phospine, alkyl amine and ligand-exchangeable coordinate compounds and may be located at the middle position of the linking compound or at the terminus; L2(+) is a functional group having at least one positive charge in the terminus, straight chain or branched chain of substituted or non-substituted $C_1$-$C_{17}$ hydrocarbon compounds which may contain at least one oxygen, nitrogen or sulfur atom; and L3(−) is a functional group having at least one negative charge in the terminus, straight chain or branched chain of substituted or non-substituted $C_1$-$C_{17}$ hydrocarbon compounds which may contain at least one oxygen, nitrogen or sulfur atom.

The term "intervening linking compound" used herein refers to any compound having a functional group at its terminal and capable of forming the linkages between the (linking compound-fiber substrate) intermediate and the (zeolite-linking compound) intermediate by linking two linking compounds bound to fibers and zeolites. Preferably, the intervening linking compound is selected from the group consisting of fullerene ($C_{60}$, $C_{70}$), carbon nanotube, α,ω-dialdehyde, dicarboxylic acid, dicarboxylic acid anhydride, amine-dendrimer, polyethyleneimine, α,ω-diamine, metal porphyrin and complex compounds represented by M(salan) (M is cobalt, nickel, chrome, manganese or iron; and saline is N,N'-bis(salicylidene)ethylenediamine).

As used herein the term "sonication" refers to a treatment step using ultrasound having a conventional frequency range known to one of skill in the art. The frequency of ultrasound is preferably in the range of 10 kHz-100 MHz; more preferably, it is in the range of 15 kHz-10 MHz; still more preferably, it is in the range of 20 kHz-10 MHz; and most preferably, it is in the range of 25-1000 kHz. Although the period of time for sonication is not restricted, it ranges preferably from 30 seconds to 10 minutes, more preferably from 1 minute to 5 minutes, and most preferably from 1 minute to 3 minutes. The sonication may be performed at a temperature range for general chemical reactions, preferably, 20-50° C., more preferably 20-40° C. and most preferably around room temperature.

The finally resulting zeolite-fiber substrate composites prepared by the present invention can be manufactured in various linkage patterns. Represented patterns will be described in more detail as follows:

Firstly, one of represented patterns is a (zeolite-linking compound-fiber substrate) composite.

For producing such pattern, a fiber substrate or a zeolite is reacted with a linking compound to form an intermediate of (linking compound-fiber substrate) or (zeolite-linking compound). The intermediate may be produced according to conventional chemical reactions, of which mechanisms and conditions are well known to one of skill in the art. In addition, the production of the intermediate may be performed by sonication. As a linking compound, (3-chloropropyl) trimethoxysilane, 3-(triethoxysilyl)propylisocyanate and the like may be used.

Then, zeolites are added into a solution containing the intermediate of (linking compound-fiber substrate), or fiber substrates are added to a solution containing the intermediate of (zeolite-linking compound), and then subject to sonication, giving rise to the rapid formation of linkages between linking compounds and zeolites (or fiber substrates) to allow zeolite crystals to form a layer onto fiber substrates.

Alternatively, this pattern may be provided by simultaneously introducing into an apparatus for preparation fiber substrates, linking compounds and zeolite crystals and then sonicating to induce linkages. For the alternative process, tetraethoxysilane, silicon tetrachloride and the like may be used.

Another represented pattern is a (zeolite-linking compound-linking compound-fiber substrate) composite.

For producing such pattern, a fiber substrate is reacted with a linking compound to form an intermediate 1 of (linking compound-fiber substrate), a zeolite is reacted with a linking compound to form an intermediate 2 of (zeolite-linking compound). The intermediates may be produced according to conventional chemical reactions, of which mechanisms and conditions are well known to one of skill in the art. In addition, the production of the intermediates may be performed by sonication. The two linking compounds used in this reaction have to be reacted with each other. For example, substitution (amino group and leaving group), ionic linking (ammonium group and carboxyl group or its salt), Diels-Alder reaction (diene group and double bond), ring-opening reaction (epoxy group and amino group), ester or amide forming reaction, glycosidic linking and the like are involved in the linkage between linking compounds. An exemplary set of linking compounds includes [3-(2,3-epoxypropoxy)-propyl]trimethoxy silane (EPS) plus 3-aminopropyltriethoxysilane (APS), (3-chloropropyl)trimethoxysilane (CPS) plus 3-aminopropyltriethoxysilane (APS) and the like. The intermediates 1 and 2 are then combined by sonication to rapidly generate the (zeolite-linking compound-linking compound-fiber substrate) composite.

A third pattern is a (zeolite-linking compound-intervening linking compound-linking compound-fiber substrate) composite.

For producing such pattern, a fiber substrate is combined with a linking compound to form an intermediate 1 and a zeolite is combined with a linking compound to form an intermediate 2. Then, the intermediates 1 and 2 are then combined through an intervening linking compound by sonication. Alternatively, the intervening linking compound is combined with the intermediate 1 or 2 and the resultant is then combined with the intermediate 2 or 1. Exemplary reaction pair of linking compound-intervening linking compound includes fullerene or carbon nanotube/amino terminal group, $\alpha,\omega$-dialdehyde, dicarboxylic acid or dicarboxylic acid anhydride/amino terminal group, amine-dendrimer/leaving group such as epoxy group and halogen, and polyethyleneimine or diamine/leaving group such as epoxy group and halogen.

In order to perform the process for preparing a composite of zeolite-tethering fiber substrate, a commercially available sonicator may be used. Preferably, the present process is performed using the apparatus (100) for preparing a composite of zeolite-tethering fiber substrate developed by the present inventors. The preparatory apparatus includes a reactor (10) containing solvent 1 and reactants, an external container (20) containing solvent 2 and accommodating the reactor, an ultrasound generator (30) and a temperature controller (40).

The reactor (10) is filled with solvent 1 and reactants including fiber substrates, linking compounds (and/or intervening linking compounds) and zeolite crystals. The solvent 1 is a solvent capable of dispersing zeolite crystals, preferably including toluene, hexane, benzene, carbon tetrachloride, octane and alcohol. The reactor containing solvent 1 is not limited in the shape. If the reactor is a round-bottomed flask, it may be connected to an external container (30) containing solvent 2 through fixing means such as stand.

It is preferred that the fiber substrates are introduced into the reactor (10) using supports such as Teflon support, even though they may be introduced into the reactor (10) without supports. The fiber substrates each sheet may be introduced to the reactor (10) for the reaction with zeolite crystals and their several sheets can be also simultaneously introduced to the reactor (10).

The method for preparing a zeolite-fiber substrate composite by using ultrasound may be classified to Type A process and Type (B) process. According to the Type A ultrasonic process, one sheet of fiber substrates linked with a linking compound and bare zeolite crystals are linked each other, or one sheet of bare fiber substrates and linking compound-tethering zeolite crystals are linked each other in the reactor. According to the Type (B) ultrasonic process, several sheets of fiber substrates combined with one or several different types of linking compounds, or several sheets of bare fiber substrates are introduced into the reactor in an overlapping fashion, and then allowed to react with linking compounds and/or zeolite crystals. In the Type (B) ultrasonic process, it is not necessary that the outermost fiber substrate is one not linked to linking compounds. The outermost fiber substrate in the Type (B) process contributes to more powerful vibration and significant reduction of physical adsorption.

The external container (20) contains solvent 2 and accommodates the reactor (10). Preferably, solvent 2 is a solvent such as water ($H_2O$) capable of transmitting ultrasound generated from the ultrasound generator (30) to reactants in the reactor. It is preferred that the top surface of solvent 2 is higher than that of solvent 1 in light of the absorption efficiency of reaction heat.

Figure 1B:
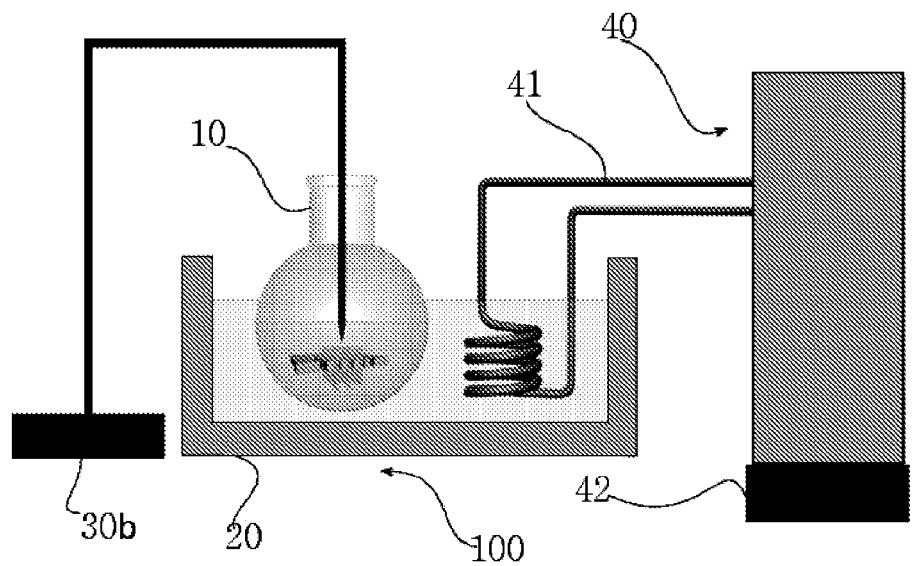
FIG. 1(B) depicts an alternative construction of the apparatus (100) for preparing zeolite-tethering fiber substrate in which an ultrasound is directly transmitted to the reactor (10) containing solvent 1 and reactants.
Figure 1C:
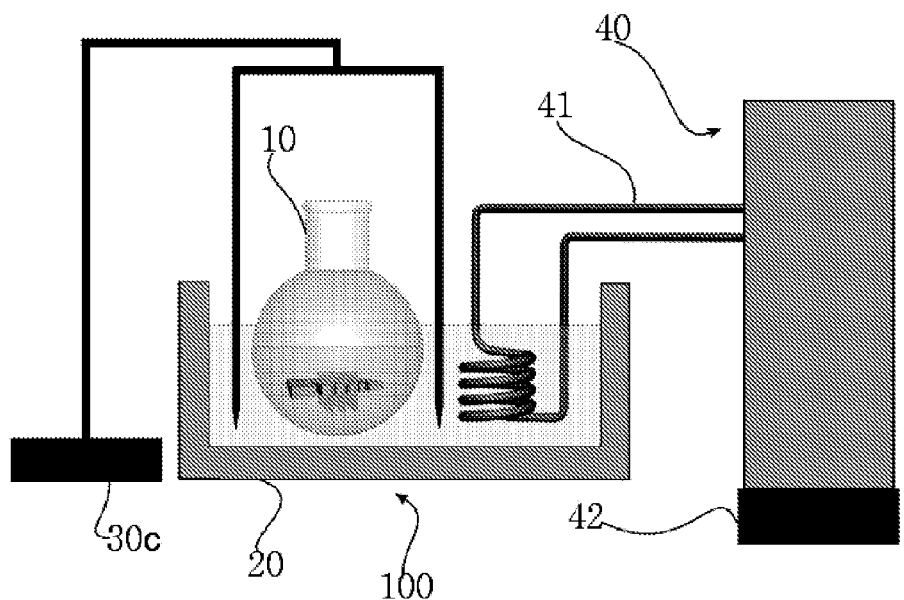
FIG. 1(C) represents an alternative construction of the apparatus (100) for preparing zeolite-tethering fiber substrate in which an ultrasound is directly transmitted to the external container (20) containing solvent 2.
Figure 1D:
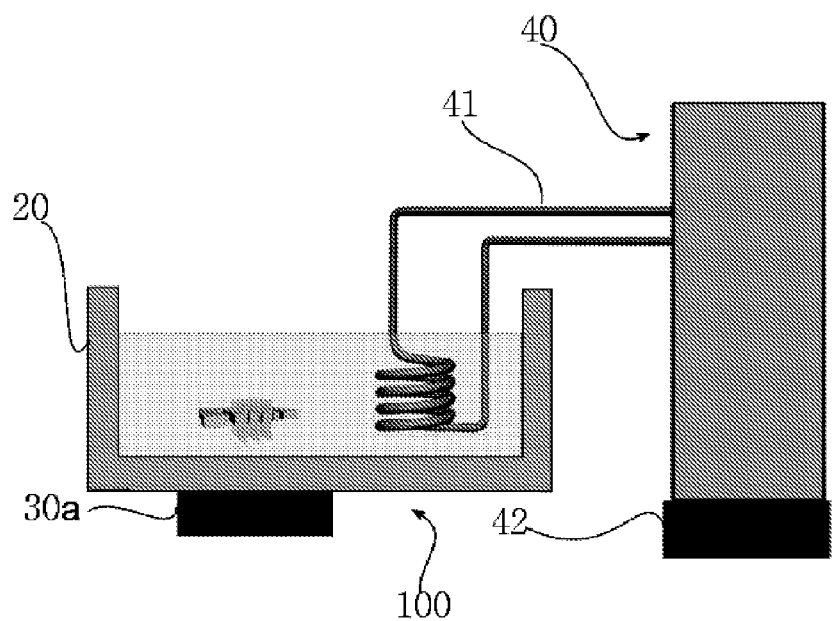
FIG. 1(D) represents an alternative construction of the apparatus (100) for preparing zeolite-tethering fiber substrate with no use of the reactor (10).
Figure 2A:
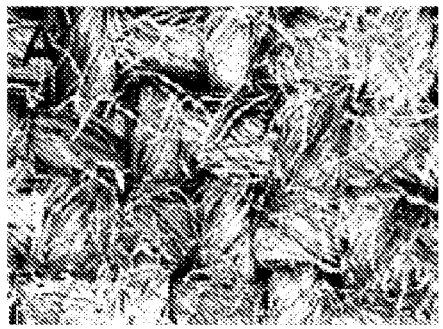
FIGS. 2(A) through 2(D) show natural fibers with linked zeolites containing silver ions prepared by sonication for 1 minuteute according to the process described in Example VIII.
Figure 2B:
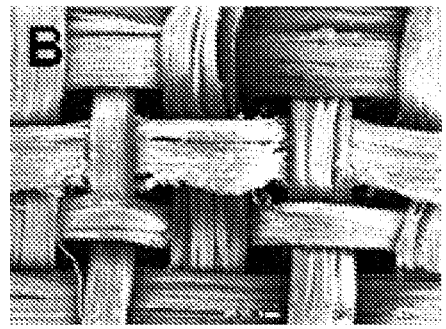
Figure 2C:
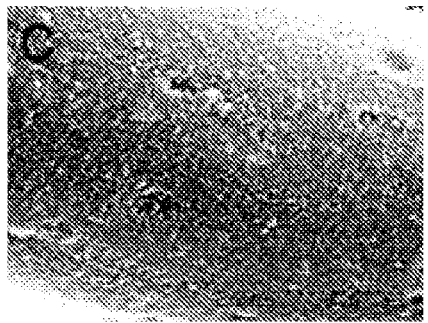
Figure 2D:
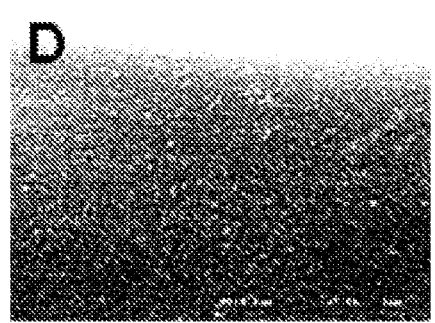
Figure 3A:
FIGS. 3(A) through 3(D) show synthetic fibers with linked zeolites containing silver ions prepared by sonication for 1 minute according to process described in Example VIII.
Figure 3B:
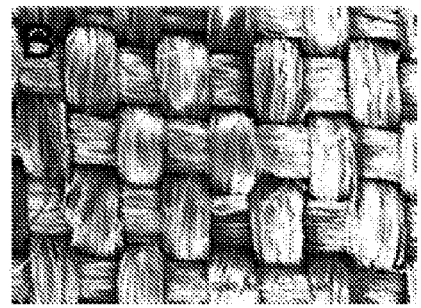
Figure 3C:
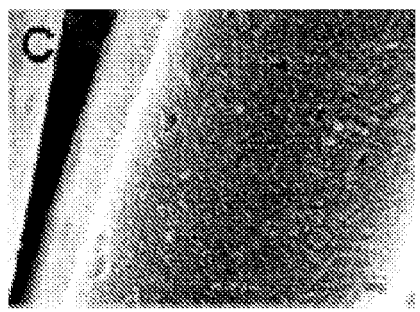
Figure 3D:
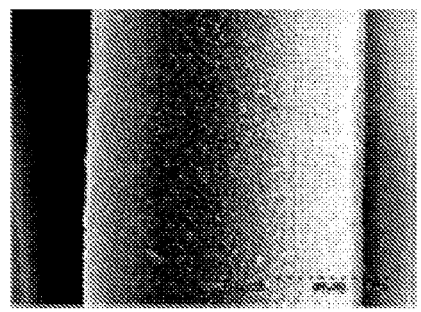
Figure 4A:
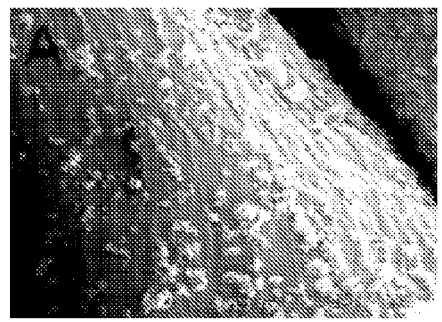
FIGS. 4(A) through 4(D) represent SEM images of fibers with linked zeolites containing silver ions prepared by the conventional refluxing method and the present method (sonication) using cotton as fiber substrates.
Figure 4B:
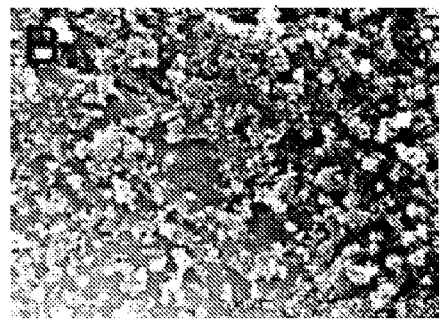
Figure 4C:
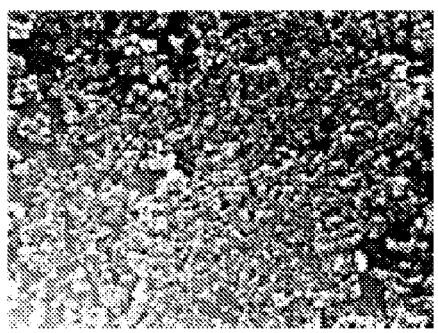
Figure 4D:
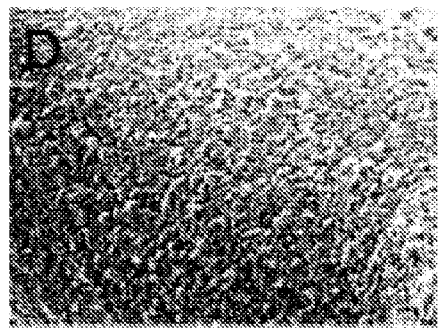

As depicted in FIG. 1(D), where substrates and zeolite crystals are induced to combine in the external container (20) instead of the reactor (10), solvent 1 instead of solvent 2 may be used in the external container (20).

A circulation coil of cooling water (41) is immersed in solvent 2 as a part of the temperature controller (40). The circulation coil of cooling water (41) circulates a cooling water out of the temperature controller (40) through coil, absorbs the reaction heat generated in the reactor (10), maintaining constantly the temperature of solvent 2.

The ultrasound generator (3) is a device generating 10 kHz-100 MHz of ultrasonic wave and further may comprise a means to control the frequency and output power of ultrasound. The ultrasound generator can transmit ultrasonic wave to an external container (20) containing solvent 2, directly to solvent 1 or to solvent 2 to induce the reaction between fiber substrates, linking compounds, intervening linking compounds and zeolite crystals.

The temperature controller (40) includes a generator of cooling water (41) and a circulation coil (42). The generator of cooling water (41) may include a device to control the flow rate of cooling water. The cooling water flows through the circulation coil, absorbs the heat generated from the reactor (10) to maintain the temperature of solvent 2 and returns to the generator. As illustrated in FIG. 1(A), the circulation coil (42) may be immersed in solvent 2 or wind the outer surface of reactor (10) or the external container (20).

FIG. 1(A) depicts the general structure of the apparatus (100) for preparing zeolite-fiber substrate composites by sonication. Its modified structures are illustrated in FIGS. 1(B) and 1(C) in which the injection position of the ultrasound generator (30) is altered. Furthermore, zeolite-fiber substrate composites may be prepared using solely the external container (20) without the reactor (10), as shown in FIG. 1(D). In this case, solvent 1 instead of solvent 2 is introduced into the external container (20).

A particular example of preparing zeolite-fiber substrate composites by use of the apparatus (100) will be described in more detail as follows:

Where the first representative pattern is prepared, fiber substrates cleared of impurities by washing and drying are introduced into the reactor (10) containing organic solvents such as toluene to form linkages with linking compounds by sonication. The linkages may also be induced using simple reflux without ultrasonic wave. The resulting fiber substrates with combined linking compounds (intermediate 1) are taken out of the reactor, washed with organic solvents such as toluene and then dried under nitrogen atmosphere. If intervening linking compounds are intended to combine with linking compounds of (linking compound-fiber substrate) intermediates, the same procedure described above is repeated with intervening linking compounds. After that, zeolite crystals are added to the reactor (10) containing organic solvents, exposed to ultrasound for about 5-15 minute for dispersion. Finally, the (linking compound-fiber substrate) (intermediate 1) prepared previously is linked to dispersed zeolite crystals by sonication for 1-2 minute to prepare zeolite-fiber substrate composites with higher density of coverage.

Where zeolite-linking compound (intermediate 2) is first prepared, the procedure as described above is also performed. When intermediates 1 and 2 are linked to each other, the similar procedure may be also carried out.

Preferably, the ultrasound used in the present invention has the frequency range of from 15 kHz to 100 MHz, increasing the reactivity of molecules involved in covalent, ionic, coordinate or hydrogen bonds between substrates and linking compounds, zeolites and linking compounds, linking compounds and linking compounds, or linking compounds and intervening linking compounds, thereby enhancing the bonding strength for shorter period of time. If the frequency of the ultrasound is over or under the range, zeolite crystals are not linked in a favorable manner. The electric power can be suitably adjusted depending on the frequency.

Through the procedure described above, a zeolite monolayer can be formed on a fiber substrate and then combined with zeolite crystals to prepare a zeolite bilayer on the fiber substrate. Such procedure can be repeated to prepare a zeolite multilayer on a fiber substrate.

In yet a further aspect of this invention, there is provided a method for preparing a multilayer of zeolite-fiber substrate, which includes forming a monolayer of a zeolite onto a fiber substrate in accordance with the present invention described previously; and linking a zeolite or an intermediate of (zeolite-linking compound) to the zeolite monolayer by contacting the monolayer to the zeolite or the intermediate of (zeolite-linking compound) and sonicating.

The zeolite crystals for producing the bilayer or multilayer may be of the same or a different type from the zeolite crystals of the monolayer. The pattern of lamination is not limited to, for example, (zeolite-linking compound)-(zeolite-linking compound-fiber substrate) and (zeolite-linking compound)-(linking compound-zeolite-linking compound)-(linking compound-fiber substrate).

According to a preferred embodiment, zeolites used in this invention contain within their pores metal ions, more preferably, metal ions with a specific activity (e.g., antibiotic activity and emission of far infrared rays); still more preferably, silver ion, sodium ion, zinc ion or copper ion; and most preferably, silver ion. The zeolite-tethering fiber substrate composites prepared using metal ion-containing zeolites have not only inherent properties derived from zeolites (e.g., antibiotic activity, flame retardancy, odor resistance, water absorption and heat retention) but also properties or functions derived from metal ions. Surprisingly, the zeolite-tethering fiber substrate composites prepared using silver ion-containing zeolites exhibit antibiotic activities of 99.9% within 18 hours post-treatment, as demonstrated in the examples discussed below.

Zeolites incorporating metal ions may be obtained by dispersing zeolites in a solution of metal salt with agitation and drying. The metal ions exist within pores of zeolites as particles having the restricted size of several nanometers (i.e., quantum point).

According to a preferred embodiment, zeolites used in this invention contain within their pores neutral dye, cationic dye, luminescent dye or compounds with sensitivity to light having a given wavelength. The zeolite-tethering fiber substrate composites prepared using zeolites containing such molecules are capable for embodying fibers showing a variety of color and luminescent fibers responding to lights having a given wavelength (e.g., ultraviolet, visible, infrared and X rays).

Non-limiting examples of neural dyes to be incorporated into zeolites include BP (1,1'-biphenyl), pTP (p-terphenyl), DPH (1,6-diphenyl-1,3,5-hexatriene), PBOX (phenylbenzoxazol), MBOXE (1,2-bis-(5-methyl-benzoxazol-2-yl)-ethene), POPOP (5,5'-diphenyl-2,2'-p-phenylenebis(oxazole)), DMPOPOP (dimethyl-POPOP), naphthalene, anthracene, isoviolanthrone, ResH, N-ethylcarbazole, fluorenone, DCS (4-(4-(dimethylamino)styryl)benzonitrile), stylbene and azobenzene.

Non-limiting examples of cationic dyes to be incorporated into zeolites include proflavin$^+$, pyronin$^+$, pyronin GY$^+$, pyronin B$^+$, pyronin Y$^+$, oxazine$^+$ and 4,4'-dimethylviologen$^{2+}$.

Non-limiting examples of luminescent dyes to be incorporated into zeolites include materials to be luminescent at triplet excitation state (e.g., 2,3,7,8,12,13,17,18-octaethyl-21H,23H-porphine platinum (PtOEP) and fac tris(2-phenylpyridine) iridium (Ir(ppy)$_3$)) and materials to be luminescent at singlet excitation state (e.g., oxadiazole, distyrylaryl, phenylamine, oxazine and perylene derivatives).

Non-limiting examples of compounds with sensitivity to light having a given wavelength include POPOP (5,5'-diphenyl-2,2'-p-phenylenebis(oxazole)) and DMPOPOP (dimethyl-POPOP).

Where zeolite crystals are linked to fiber substrates in a mono- or multi-layer form according to the present invention using ultrasound, they can be tethered to fiber substrates in a wider variety of fashions compared with simple refluxing method. In addition, the present invention allows for a successful mass production of composites of zeolite-fiber substrate exhibiting significantly improved attachment rate and strength, degree of coverage (DOC) and density of coverage in a time- and energy-saving manner. A molecular sieve-fiber substrate can also be prepared by the present process in which porous molecular sieve crystals are bound onto the surface of natural or synthetic fiber substrates via chemical linkages (covalent, ionic or coordinate bonds).

Because the zeolite-tethering fiber substrate prepared by the present process retains flexibility, it is very advantageous in terms of usefulness and practicability. The present composite retains inherent properties derived from zeolites (e.g., antibiotic activity, flame retardancy, odor resistance, absorption and heat retention) and therefore can become a promising new material to overcome restrictions in the use of zeolite properties. In addition, the zeolite-tethering fiber substrate shows remarked thermal stability ascribed to a zeolite layer, being applicable to development of fiber with excellent flame retardancy.

More specifically, because the zeolite-tethering fiber substrate prepared by the present process can be prepared with less thickness and shows improved antibiotic activity, odor resistance and absorption capacity, it therefore can be applied to feminine hygiene products (e.g., sanitary napkins and tampons), diapers, wallpaper, floor coverings, shoes, socks, bedclothes, underwear and other clothes.

Where the composite is prepared using zeolites containing dye molecules within their pores, it makes it possible to manufacture fibers exhibiting various colors or luminescence sensitized to ultraviolet rays.

The following specific examples are intended to be illustrative of the invention and should not be construed as limiting the scope of the invention as defined by appended claims.

EXAMPLE I

Pretreatment of Zeolites

As described previously, zeolites have cation sites within their pore structure. NaY among zeolites bears sodium ions (Na$^+$) as cations. Zeolite Y crystals with the average size of 100 nm used in Examples were synthesized according to processes described in Goo Soo Lee, et al., *Adv. Mat.*, 13:1491 (2001). Zeolite Y crystals (1 g) were well dispersed in 0.1 M aqueous solution of silver nitrate (AgNO$_3$) and agitated for 24 hours. Following the filtration through a filter paper, zeolite Y crystals were washed with distilled water and dried at room temperature or 120° C. (in an oven), giving zeolite Y crystals containing silver ions (Ag$^+$). The silver ions exist within pores of zeolites as particles having the restricted size of several nanometers (i.e., quantum point).

For ion-exchanging with copper (Cu$^+$, Cu$^{2+}$) or zinc (Zn$^{2+}$) ion, copper chloride or zinc chloride was used.

EXAMPLE II

Preparation of Zeolite-Tethering Fiber Substrate Using 3-Chloropropyl Trimethoxysilane (CPS)

600 mg of zeolite crystals containing silver ions prepared in Example I were introduced into a toluene-containing reactor and 2 ml of 3-chloropropyl trimethoxysilane (Aldrich) were added to the reactor, followed by heating for 2 hours. Upon the completion of reaction, 3-chloropropy-tethered zeolites were filtered and washed with toluene and methanol. 50 mg of zeolites were added into a 50 ml round-bottomed flask, 40 ml of toluene were added and dispersed using a sonicator. Several sheets of cellulose were immersed into the round-bottomed flask and the flask was placed into an ultrasonic bath equipped with a ultrasound generator. Water was introduced into the bath to the extent that the top surface of toluene in the round flask was fully immersed and the temperature of the bath was kept to 20° C. using a temperature-controlled immersion cooler. The reaction was carried out for 1 minute using ultrasound (28 kHz of frequency, 96 W of electric power). Then, zeolite-bound cellulose sheets were taken out of the reactor and washed several times with toluene, followed by subjecting to weak sonication for 30 sec to remove unbound zeolites. The resulting zeolite-tethering cellulose composites were revealed to exhibit antibacterial activity.

It could be appreciated by one of skill in the art that the process described in Example II is applicable to various fibers such as cotton, ramie fabric, hemp, linen, flax, silk, polyester, polyimide, polypropylene and nylon as well as cellulose, yielding successfully the corresponding zeolite-tethering fiber.

Figure 6A:
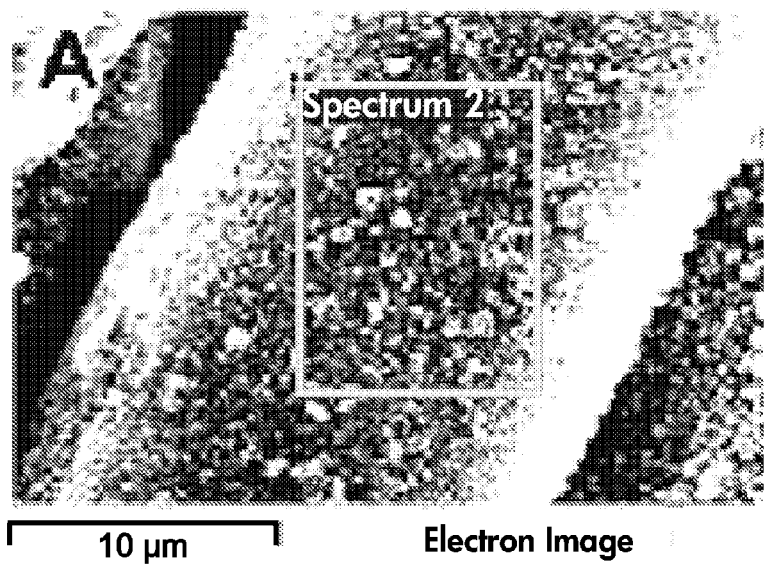
FIGS. 6(A) and 6(B) show the results of elemental analysis for zeolite-tethering fiber substrate (polyester) prepared by the present sonication method as described in Example II.
Figure 6B:
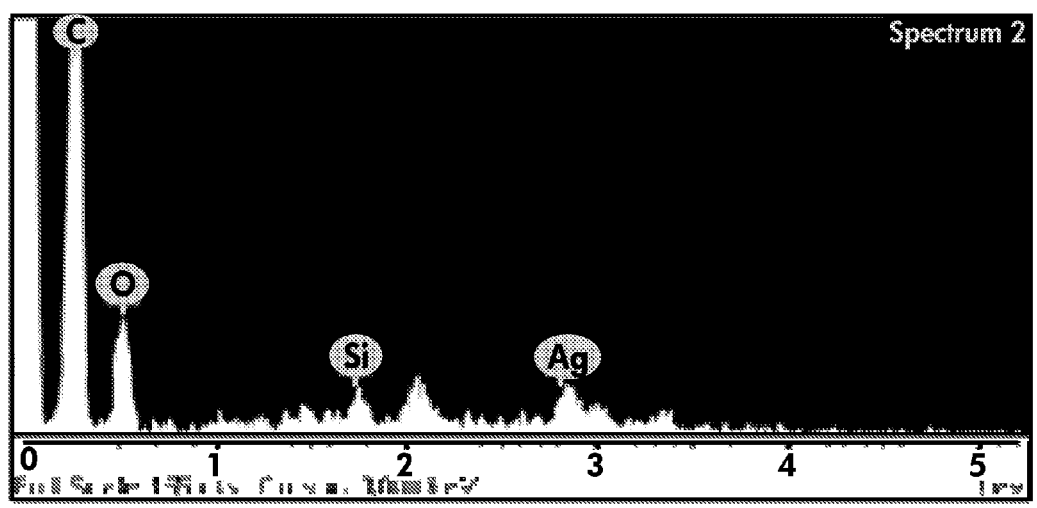

As shown in FIGS. 6(A) and 6(B), the zeolite-tethering fiber substrate (polyester) prepared in this Example includes carbon (C), oxygen (O) and silicon (Si) and silver (Ag).

EXAMPLE III

Preparation of Zeolite-Tethering Fiber Substrate Using 3-Triethoxysilylpropyl Isocyanate Several sheets of cotton washed by heating in ethanol were introduced into the toluene-containing reactor and 2 ml of 3-triethoxysilylpropyl isocyanate (Aldrich) were added to the reactor, followed by heating for 1 hour at 110° C., generating urea bonds between isocyanate groups between hydroxyl groups on cotton. After cooling to room temperature, the cotton was well washed with toluene. The triethoxysilylpropyl-tethered cotton was immersed in the suspension of silver ion-containing zeolite crystals in toluene (Example I) and subject to ultrasonication as described in Example II for 1 minute at room temperature. Following the completion of reaction, zeolite-bound cotton sheets were taken out of the reactor and washed several times with toluene. The resulting zeolite-tethering cotton composites were examined to exhibit antibacterial activity.

It could be appreciated by one of skill in the art that the process described in Example III is applicable to various fibers such as cellulose, ramie fabric, hemp, linen, flax, silk, polyester, polyimide, polypropylene and nylon as well as cotton, giving successfully the corresponding zeolite-tethering fiber composites.

EXAMPLE IV

Preparation of Zeolite-Tethering Fiber Substrate Using EPS and APS

Several sheets of hemp washed by heating in ethanol were reacted with 2 mM ([3-(2,3-epoxypropoxy)-propyl]trimethoxysilane: EPS, Aldrich) in toluene for 1 hour at 110° C. After cooling to room temperature, the hemp sheets were well washed with toluene. 600 mg of silver ion-entrapping zeolite crystals prepared in Example I were reacted with 2 mM 3-aminopropyl triethoxysilane (APS, Aldrich) in toluene for 1 hour at 110° C. and cooled to room temperature. Aminopropyl-tethered zeolite crystals were filtered and well washed. 50 mg of aminopropyl-tethered zeolite crystals were added to toluene and well dispersed by ultrasonication to obtain a zeolite suspension. To the suspension of zeolite crystals, EPS-treated hemp sheets were added and then subjected to ultrasonication as described in Example II for 1 minute at room temperature. Following the completion of reaction, zeolite-bound hemp sheets were taken out of the reactor and washed several times with toluene. The resulting zeolite-tethering hemp composites were tested to exhibit antibacterial activity.

It could be recognized by one of skill in the art that the process described in Example IV is applicable to various fibers such as cellulose, ramie fabric, cotton, linen, flax, silk, polyester, polyimide, polypropylene and nylon as well as hemp, resulting successfully in the production of the corresponding zeolite-tethering fiber composites.

EXAMPLE V

Preparation of Zeolite-Tethering Fiber Substrate Using CPS and APS

Several sheets of linen washed by heating in ethanol were reacted with 2 mM 3-aminopropyl triethoxysilane (APS) in toluene for 1 hour at 110° C. and cooled to room temperature, followed by washing with toluene. 3-Chloropropyl-tethered zeolite crystals entrapping silver ions within their pores were prepared as described in Examples I and II. 50 mg of zeolite crystals obtained thus were added to toluene and well dispersed by ultrasonication to obtain a zeolite suspension. To the suspension of zeolite crystals, APS-treated line sheets were added and then subjected to ultrasonication as described in Example II for 1 minute at room temperature. Following the completion of reaction, zeolite-bound linen sheets were taken out of the reactor and washed several times with toluene. The resulting zeolite-tethering line composites were analyzed to exhibit antibacterial activity.

It could be understood by one skilled in the art that the process described in Example V is applicable to various fibers such as cellulose, ramie fabric, cotton, hemp, flax, silk, polyester, polyimide, polypropylene and nylon as well as linen, resulting successfully in the production of the corresponding zeolite-tethering fiber composites.

EXAMPLE VI

Preparation of Zeolite-Tethering Fiber Substrate Using α,ω-Dialdehyde

Several sheets of 3-aminopropyl-tethered linen as described in Example V were reacted with 2 mM terephtaldicarboxaldehyde (OHC—$C_6H_4$—CHO, Aldrich) and a catalytic amount of acetic acid in toluene for 3 hours at 110° C. and cooled to room temperature, followed by washing with toluene and methanol. 50 mg of 3-aminopropyl-tethered zeolite crystals as described in Example IV were well dispersed in toluene and the formyl-bound linen sheets were added to the dispersion, followed by ultrasonication as described in Example II for 1 minute at room temperature. Following the completion of reaction, zeolite-bound linen sheets were taken out of the reactor and washed several times with toluene. The resulting zeolite-tethering line composites were analyzed to show antibacterial activity.

It could be understood by one skilled in the art that the process described in Example V is applicable to various fibers such as cellulose, ramie fabric, cotton, hemp, flax, silk, polyester, polyimide, polypropylene and nylon as well as linen, resulting successfully in the production of the corresponding zeolite-tethering fiber composites.

EXAMPLE VII

Preparation of Zeolite-Tethering Fiber Substrate Using Amine-Dendrimer

Several sheets of EPS-treated linen as described in Example IV were reacted with 2 mM amine dendrimer (Aldrich) in methanol for 2 hours at 65° C. and cooled to room temperature, followed by washing with methanol and distilled water. Zeolite crystals of Example I were treated with 2 mM ([3-(2,3-epoxypropoxy)-propyl]trimethoxysilane: EPS, Aldrich) in toluene for 2 hours at 110° C. After cooling to room temperature, zeolite crystals were filtered and well washed with toluene and methanol. 50 mg of 3-(2,3-epoxypropoxy)propyl-tethered zeolite crystals were well dispersed in toluene and dendrimer-treated linen sheets were added to the dispersion, followed by ultrasonication as described in Example II for 1 minute at room temperature. Following the completion of reaction, zeolite-bound linen sheets were taken out of the reactor and washed several times with toluene. The zeolite-tethering line composites obtained thus were analyzed to show antibacterial activity.

It could be understood by one skilled in the art that the process described in Example V is applicable to various fibers such as cellulose, ramie fabric, cotton, hemp, flax, silk, polyester, polyimide, polypropylene and nylon as well as linen, resulting successfully in the production of the corresponding zeolite-tethering fiber composites.

EXAMPLE VIII

Preparation of Monolayer of Zeolite Crystals Using Polyethylene Imine

Several sheets of cotton were reacted with 2 mM 3-chloropropyl trimethoxysilane (CPS) in toluene for 2 hours at 110° C. and cooled to room temperature, followed by washing with toluene and methanol. The CPS-treated cotton sheets were reacted with 40 mg of polyethyleneimine (low molecular weight, Aldrich) in toluene for 2 hours at 110° C. After cooling to room temperature, the cotton sheets were washed using fresh toluene and methanol each for 1 hour with heating. As described in Example II, 3-chloropropyl-tethered zeolite crystals were prepared. 50 mg of 3-chloropropyl-tethered zeolite crystals were well dispersed in toluene and polyethyleneimine-treated cotton sheets were added to the dispersion, followed by ultrasonication as described in Example II for 1 minute at room temperature. Following the completion of reaction, zeolite-bound cotton sheets were taken out of the reactor and washed several times with toluene. The zeolite-tethering cotton composites obtained thus were analyzed to show antibacterial activity.

It could be understood by one skilled in the art that the process described in Example V is applicable to various fibers such as cellulose, ramie fabric, linen, hemp, flax, silk, polyester, polyimide, polypropylene and nylon as well as cotton, yielding the corresponding zeolite-tethering fiber composites.

EXAMPLE IX

SEM (Scanning Electron Microscope) Analysis

The SEM images of the zeolite-tethering fiber composites prepared above were obtained using a field-emission SEM (FE-SEM) (Hitachi S-4300) at an acceleration voltage of 10 to 20 kV. A platinum/palladium alloy (in the ratio of 8 to 2) was deposited with a thickness of about 15 nm on the top of the samples. As shown in FIGS. 2(A) through 4(D) for the SEM images of the composites prepared above, zeolite crystals were uniformly bound onto the surface of substrates such as cellulose, linen and hemp, explicitly addressing the formation of composites of zeolite-linking compound-fiber substrate.

EXAMPLE X

Analysis of Antibiotic Activity $1 \times 10^8$ cells/ml of microbe to be tested were suspended in a physiological saline solution. The microbial suspension was dispersed on media using a Conradi rod (0.1 ml). Sabourand agar medium was used for Eumycetes and Mueller Hinton culture medium for the other microbes. The composites of zeolite-fiber substrate prepared in Examples II-IX were processed to a disc with a diameter of 8 mm. The discs was placed onto the media and incubated for 18 hours at 37° C. except for Eumycetes (for 1 week at 30° C.). The inhibition zones formed on the media ascribed to antibiotic activity of the composites were measured. As a result, it was revealed that the composites of this invention had the antibiotic activity to various microbes such as Eumycetes, *Escherichia coli, Pseudomonas aeruginosa, Staphylococcus aureus, Candida albicans* and *Aspergillus flavus*.

EXAMPLE XI

Figure 8A:
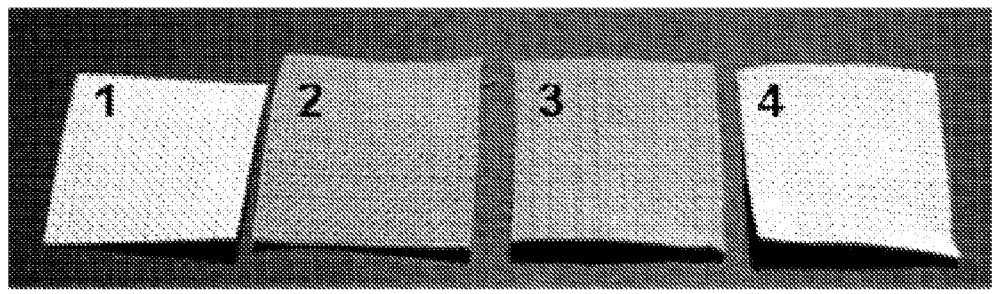
FIGS. 8(A) and 8(B) are digital photographs of fiber substrates (cotton) with linked zeolites incorporating various dyes prepared by the present sonication method as described in Example XI.
Figure 8B:
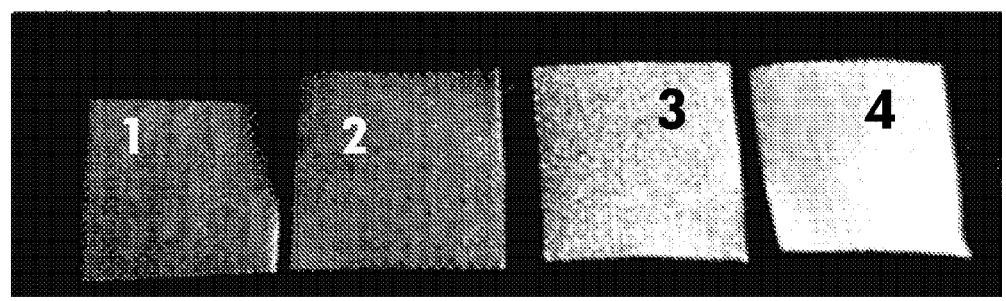

Pretreatment of Zeolites 600 mg of Zeolite-NaY having a size of 100 nm and 40 mg of pyronin Y were introduced to a round-bottomed flask, to which 40 ml of water added. Separately, 600 mg of Zeolite-NaY having a size of 100 nm were added to an ample-typed tube and heated under vacuum for 6 hours at 400° C. to remove water. To the dried zeolite-NaY crystals, 40 mg of POPOP (5,5'-diphenyl-2,2'-p-phenylenebis(oxazole)) were added under vacuum and the resultant was processed to an ample form, followed by heating for 24 hours at 250° C. The zeolites were filtered, washed with distilled water and dried at room temperature or in an oven (120° C.), yielding zeolite-Y crystals incorporating pyronin Y or POPOP within their pores. The zeolite-Y crystals were tethered onto fiber substrates as described in Example VIII (see FIGS. 8(A) and 8(B)).

COMPARATIVE EXAMPLE

Preparation of Zeolite-Tethering Fiber Substrate by Simple Refluxing Process (Prior Art)

50 mg of AgY with a size of 100 nm were introduced into a 50 ml round-bottomed flask, to which 40 ml of toluene were added. The toluene solution was dispersed for 5 minutes using ultrasound and a linking compound-tethered fiber substrate was then added, followed by refluxing for a given period of time (e.g., 1 hour, 1.5 hours, 2 hours or 3 hours) to obtain a composite of zeolite-tethering fiber substrate.

EXAMPLE XII

Thermogravimetic Analysis

Figure 5A:
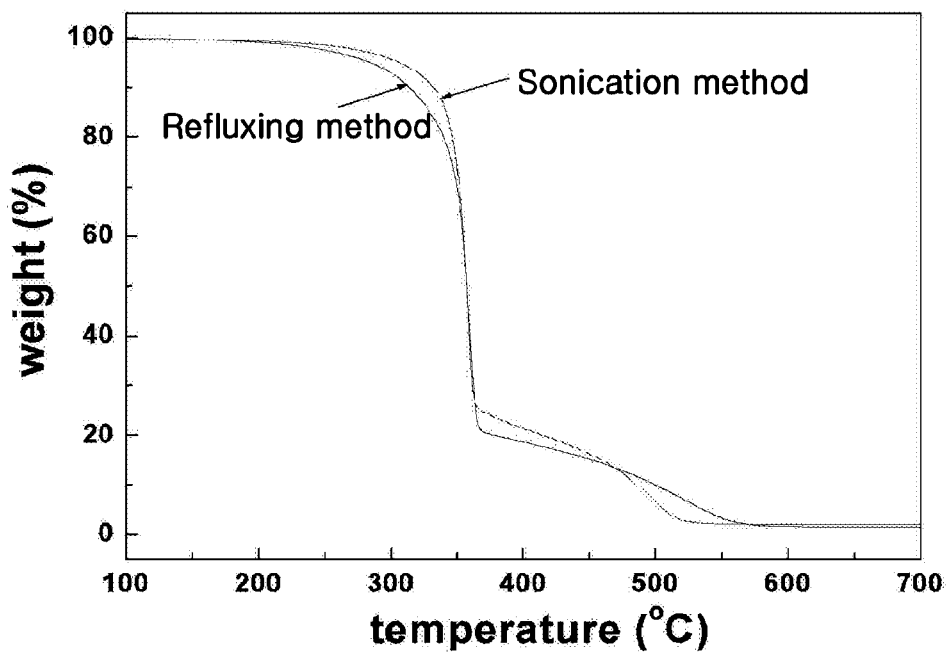
FIGS. 5(A) and 5(B) show the results of thermogravimetric analysis for zeolite-tethering fiber substrates (cotton) prepared by the conventional reflux for 2 hours or the present sonication method for 1 minute.
Figure 5B:
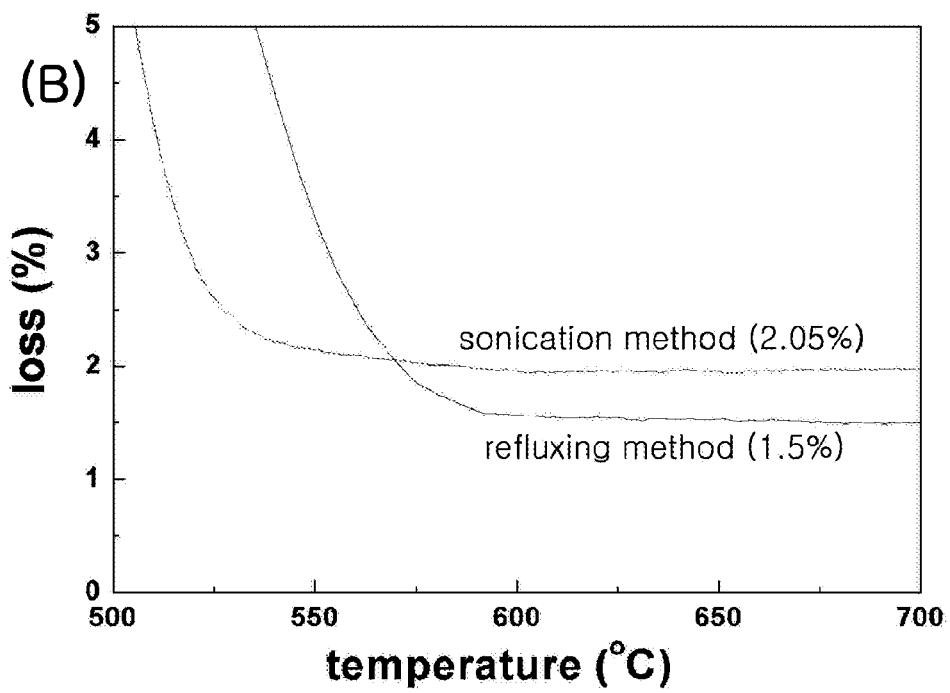

A thermogravimetric analysis was performed under nitrogen atmosphere for the present composite (zeolite-tethering fiber substrate prepared in Example VIII) and the composite prepared by a simple refluxing. The analysis was carried out by heating with the temperature increasing at a rate of 20° C./minute over a temperature range from 100° C. to 900° C., and the resulting mass changes were measured. It was revealed that the present method employing ultrasonication (2.05%) allowed a larger amount of nanosized silver ion-containing zeolites to be bound to deeper sites of fiber substrates compared with the simple refluxing method (1.5%) (see FIGS. 5(A) and 5(B)).

Figure 7A:
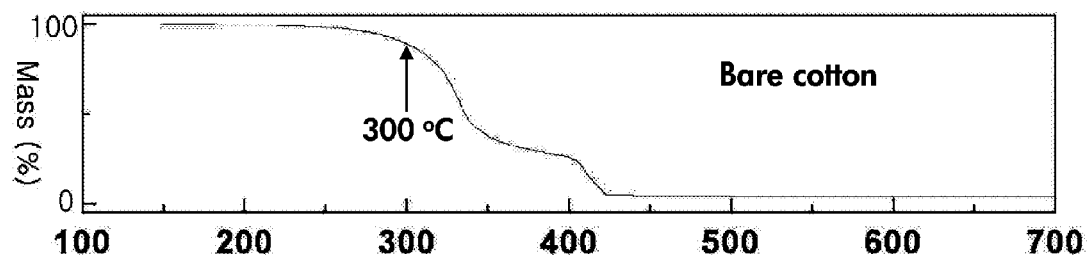
FIGS. 7(A) through 7(C) show the results of thermogravimetric analysis for zeolite-tethering fiber substrates (cotton) prepared by the conventional reflux for 2 hours or the present sonication method for 1 minute as described in Example VIII. A bare cotton (FIG. 7(A)), zeolite-tethering fiber prepared by sonication (FIG. 7(B)) and zeolite-tethering fiber prepared by simple refluxing (FIG. 7(C)) show 20% loss of initial mass at different temperatures from each other, urging us to reason that zeolite-tethering fibers prepared by the present invention exhibit enhanced flame retardancy compared with bare cotton materials and zeolite-tethering fibers prepared by simple refluxing because of more compact binding of zeolites onto fiber substrates.
Figure 7B:
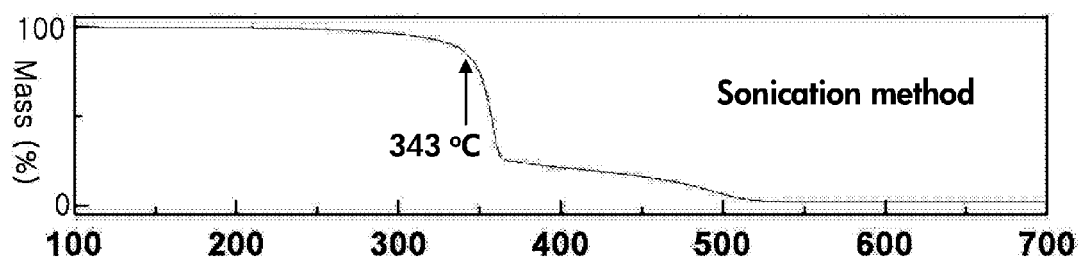
Figure 7C:
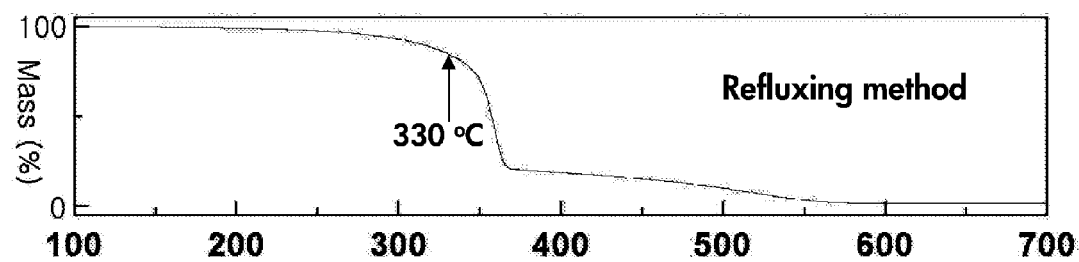

In addition, the thermogravimetric analysis was performed for the present composite (zeolite-tethering fiber substrate prepared by ultrasonication for 1 minute in Example VIII) and the composite prepared by a simple refluxing for 2 hours (FIGS. 7(A) through 7(C)). FIGS. 7(A) through 7(C) show that a bare cotton (FIG. 7(A)), zeolite-tethering fiber prepared by ultrasonication (FIG. 7(B)) and zeolite-tethering fiber prepared by simple refluxing (FIG. 7(C)) exhibit 20% loss of initial mass at different temperatures from each other. This result demonstrates that zeolite-tethering fibers prepared by ultrasonication have enhanced flame retardancy compared with bare cotton materials and zeolite-tethering fibers prepared by simple refluxing because of more compact binding of zeolites onto fiber substrates.

Having described example preferred embodiments of the present invention, it is to be understood that variants and modifications thereof falling within the spirit of the invention may become apparent to those skilled in this art, and the scope of this invention is to be determined by appended claims and their equivalents.

What is claimed is:

1. A method for preparing a composite of zeolite-fiber substrate, which comprises the steps of:
(a) reacting a fiber substrate or a zeolite with a linking compound to form an intermediate of linking compound-fiber substrate or zeolite-linking compound; and
(b) preparing the composite of zeolite-linking compound-fiber substrate by (i) inducing linking of the intermediate of linking compound-fiber substrate to the zeolite by sonication or (ii) inducing linking of the intermediate of zeolite-linking compound to the fiber substrate by sonication, wherein the method does not include a refluxing step for linking the zeolite to the fiber substrate.

2. The method according to claim 1, wherein the fiber substrate is (i) a natural fiber selected from the group consisting of cotton, kapok, linen, ramie, hemp, jute, sisal, coir, starch, lignin, sheep wool, goat hair, cashmere hair, alpaca, vicuna wool, lama wool, silk, cultivated silk and tussah silk; or (ii) a synthetic fiber selected from the group consisting of acetate-based fiber, triacetate-based fiber, polyimide fiber, polyester fiber, polyurethane fiber, polyethylene fiber, polyvinyl chloride fiber, polyvinylidene chloride fiber, polyfluoroethylene fiber, polyvinyl alcohol fiber, polyacrylo nitrile fiber and polypropylene fiber.

3. The method according to claim 1, wherein the linking compound is a compound selected from the group consisting of the compounds represented by the following formulas 1-7:

| Z-L1-X | Formula 1 |
| MR'$_4$ | Formula 2 |
| R3Si-L1-Y | Formula 3 |
| HS-L1-X | Formula 4 |
| HS-L1-SiR$_3$ | Formula 5 |
| HS-L1-Y | Formula 6 |
| Z-L2(+)L3(−)—Y or Z-L3(−)L2(+)—Y | Formula 7 | wherein, Z is R$_3$Si or isocyanate (—NCO); R is halogen, $C_1$-$C_4$ alkoxy or $C_1$-$C_4$ alkyl and at least one of three R$_5$ is halogen or alkoxy; L1 is a substituted or non-substituted $C_1$-$C_{17}$ alkyl, aralkyl or aryl and may contain one or more oxygen, nitrogen or sulfur atoms; X is halogen, isocyanate (—NCO), tosyl or azide; R' is halogen, $C_1$-$C_4$ alkoxy or $C_1$-$C_4$ alkyl and at least two of four R's is halogen or alkoxy; M is silicon, titanium or zirconium; Y is hydroxyl, thiol, amine, ammonium, sulfone or its salt, carboxylic acid or its salt, acid anhydride, epoxy, aldehyde, ester, acryl, isocyanate (—NCO), sugar residue, double bond, triple bond, diene, diyne, alkyl phospine, alkyl amine and ligand-exchangeable coordinate compounds and may be located at the middle position of the linking compound or at the terminus; L2(+) is a functional group having at least one positive charge in the terminus, straight chain or branched chain of substituted or non-substituted $C_1$-$C_{17}$ hydrocarbon compounds which may contain at least one oxygen, nitrogen or sulfur atom; and L3(−) is a functional group having at least one negative charge in the terminus, straight chain or branched chain of substituted or non-substituted $C_1$-$C_{17}$ hydrocarbon compounds which may contain at least one oxygen, nitrogen or sulfur atom.

4. The method according to claim 1, wherein the linking compound is a compound selected from the group consisting of fullerene, carbon nanotube, α,ω-dialdehyde, dicarboxylic acid, dicarboxylic acid anhydride, amine-dendrimer, polyethyleneimine, α,ω-diamine, metal porphyrin and complex compounds represented by M(salan) (M is cobalt, nickel, chrome, manganese or iron; and saline is N,N'-bis(salicylidene)ethylenediamine).

5. The method according to claim 1, wherein the sonication is carried out using a sound wave having a frequency of 10 kHz-100 MHz.

6. The method according to claim 1, wherein the zeolite is one containing within its pores silver ion, sodium ion, zinc ion, copper ion, neutral dye, cationic dye, luminescent dye or compounds with sensitivity to light having a given wavelength.

7. The method according to claim 1, wherein the zeolite is selected from the group consisting of:
  (i) natural and synthetic zeolites;
  (ii) zeolites having MFI structure and their analogues;
  (iii) zeolites having MEL structure and their analogues;
  (iv) zeolites (A), X, Y, L, beta, modenite, perialite, ETS-4 and ETS-10;
  (v) mesoporous silica;
  (vi) zeolites and zeotype molecular sieves generated through hydrothermal synthesis;
  (vii) organic-inorganic complexed mesoporous structure and laminate; and
  (viii) nanoporous materials called as organic zeolite, organic metal zeolite or coordinate compound zeolite in which metal ions and ligands are combined in a three-dimension to form nanopores.

8. A method for preparing a composite of zeolite-fiber substrate, which comprises the steps of:
  (a) reacting a fiber substrate with a linking compound to form an intermediate of linking compound-fiber substrate;
  (b) reacting a zeolite with a linking compound to form an intermediate of zeolite-linking compound; and
  (c) preparing the composite of zeolite-linking compound-fiber substrate by inducing linking of the intermediate of linking compound-fiber substrate to the intermediate of zeolite-linking compound by sonification, wherein the method does not include a refluxing step for linking the zeolite to the fiber substrate.

9. The method according to claim 8, wherein the fiber substrate is (i) a natural fiber selected from the group consisting of cotton, kapok, linen, ramie, hemp, jute, sisal, coir, starch, lignin, sheep wool, goat hair, cashmere hair, alpaca, vicuna wool, lama wool, silk, cultivated silk and tussah silk; or (ii) a synthetic fiber selected from the group consisting of acetate-based fiber, triacetate-based fiber, polyimide fiber, polyester fiber, polyurethane fiber, polyethylene fiber, polyvinyl chloride fiber, polyvinylidene chloride fiber, polyfluoroethylene fiber, polyvinyl alcohol fiber, polyacrylo nitrile fiber and polypropylene fiber.

10. The method according to claim 8, wherein the linking compound is a compound selected from the group consisting of compounds represented by the following formulas 1-7:

| | |
|---|---|
| Z-L1-X | Formula 1 |
| MR'$_4$ | Formula 2 |
| R3Si-L1-Y | Formula 3 |
| HS-L1-X | Formula 4 |
| HS-L1-SiR$_3$ | Formula 5 |
| HS-L1-Y | Formula 6 |
| Z-L2(+)L3(−)—Y or Z-L3(−)L2(+)-Y | Formula 7 | wherein, Z is R$_3$Si or isocyanate (—NCO); R is halogen, $C_1$-$C_4$ alkoxy or $C_1$-$C_4$ alkyl and at least one of three Rs is halogen or alkoxy; L1 is a substituted or non-substituted $C_1$-$C_{17}$ alkyl, aralkyl or aryl and may contain one or more oxygen, nitrogen or sulfur atoms; X is halogen, isocyanate (—NCO), tosyl or azide; R' is halogen, $C_1$-$C_4$ alkoxy or $C_1$-$C_4$ alkyl and at least two of four R's is halogen or alkoxy; M is silicon, titanium or zirconium; Y is hydroxyl, thiol, amine, ammonium, sulfone or its salt, carboxylic acid or its salt, acid anhydride, epoxy, aldehyde, ester, acryl, isocyanate (—NCO), sugar residue, double bond, triple bond, diene, diyne, alkyl phospine, alkyl amine and ligand-exchangeable coordinate compounds and may be located at the middle position of the linking compound or at the terminus; L2(+) is a functional group having at least one positive charge in the terminus, straight chain or branched chain of substituted or non-substituted $C_1$-$C_{17}$ hydrocarbon compounds which may contain at least one oxygen, nitrogen or sulfur atom; and L3(−) is a functional group having at least one negative charge in the terminus, straight chain or branched chain of substituted or non-substituted $C_1$-$C_{17}$ hydrocarbon compounds which may contain at least one oxygen, nitrogen or sulfur atom.

11. The method according to claim 8, wherein the linking compound is a compound selected from the group consisting of fullerene, carbon nanotube, α,ω-dialdehyde, dicarboxylic acid, dicarboxylic acid anhydride, amine-dendrimer, polyethyleneimine, α,ω-diamine, metal porphyrin and complex compounds represented by M(salan) (M is cobalt, nickel, chrome, manganese or iron; and saline is N,N'-bis(salicylidene)ethylenediamine).

12. The method according to claim 8, wherein the sonication is carried out using a sound wave having a frequency of 10 kHz-100 MHz.

13. The method according to claim 8, wherein the zeolite is one containing within its pores silver ion, sodium ion, zinc ion, copper ion, neutral dye, cationic dye, luminescent dye or compounds with sensitivity to light having a given wavelength.

14. The method according to claim 8, wherein the zeolite is selected from the group consisting of:
  (i) natural and synthetic zeolites;
  (ii) zeolites having MFI structure and their analogues;
  (iii) zeolites having MEL structure and their analogues;
  (iv) zeolites (A), X, Y, L, beta, modenite, perialite, ETS-4 and ETS-10;
  (v) mesoporous silica;
  (vi) zeolites and zeotype molecular sieves generated through hydrothermal synthesis;
  (vii) organic-inorganic complexed mesoporous structure and laminate; and
  (viii) nanoporous materials called as organic zeolite, organic metal zeolite or coordinate compound zeolite in which metal ions and ligands are combined in a three-dimension to form nanopores.

15. A method for preparing a composite of zeolite-fiber substrate, which comprises steps of:
  (a) reacting a fiber substrate with a linking compound to form an intermediate of linking compound-fiber substrate;
  (b) reacting a zeolite with a linking compound to form an intermediate of zeolite-linking compound; and
  (c) preparing the composite of zeolite-fiber substrate by inducing linking of the terminal of the linking compound in the intermediate of linking compound-fiber substrate to one terminal of an intervening linking compound by sonication and then inducing linking of the terminal of the linking compound in the intermediate of zeolite-linking compound to the other terminal of the intervening linking compound by sonication to form a zeolite-linking compound-intervening linking compound-linking compound-fiber substrate, wherein the method does not include a refluxing step for linking the zeolite to the fiber substrate.

16. The method according to claim 15, wherein the fiber substrate is (i) a natural fiber selected from the group consisting of cotton, kapok, linen, ramie, hemp, jute, sisal, coir, starch, lignin, sheep wool, goat hair, cashmere hair, alpaca, vicuna wool, lama wool, silk, cultivated silk and tussah silk; or (ii) a synthetic fiber selected from the group consisting of acetate-based fiber, triacetate-based fiber, polyimide fiber, polyester fiber, polyurethane fiber, polyethylene fiber, polyvinyl chloride fiber, polyvinylidene chloride fiber, polyfluoroethylene fiber, polyvinyl alcohol fiber, polyacrylo nitrile fiber and polypropylene fiber.

17. The method according to claim 15, wherein the linking compound is a compound selected from the group consisting of compounds represented by the following formulas 1-7:

| | |
|---|---|
| Z-L1-X | Formula 1 |
| MR'$_4$ | Formula 2 |
| R3Si-L1-Y | Formula 3 |
| HS-L1-X | Formula 4 |
| HS-L1-SiR$_3$ | Formula 5 |
| HS-L1-Y | Formula 6 |
| Z-L2(+)L3(−)—Y or Z-L3(−)L2(+)—Y | Formula 7 | wherein, Z is R$_3$Si or isocyanate (—NCO); R is halogen, $C_1$-$C_4$ alkoxy or $C_1$-$C_4$ alkyl and at least one of three Rs is halogen or alkoxy; L1 is a substituted or non-substituted $C_1$-$C_{17}$ alkyl, aralkyl or aryl and may contain one or more oxygen, nitrogen or sulfur atoms; X is halogen, isocyanate (—NCO), tosyl or azide; R' is halogen, $C_1$-$C_4$ alkoxy or $C_1$-$C_4$ alkyl and at least two of four R's is halogen or alkoxy; M is silicon, titanium or zirconium; Y is hydroxyl, thiol, amine, ammonium, sulfone or its salt, carboxylic acid or its salt, acid anhydride, epoxy, aldehyde, ester, acryl, isocyanate (—NCO), sugar residue, double bond, triple bond, diene, diyne, alkyl phospine, alkyl amine and ligand-exchangeable coordinate compounds and may be located at the middle position of the linking compound or at the terminus; L2(+) is a functional group having at least one positive charge in the terminus, straight chain or branched chain of substituted or non-substituted $C_1$-$C_{17}$ hydrocarbon compounds which may contain at least one oxygen, nitrogen or sulfur atom; and L3(−) is a functional group having at least one negative charge in the terminus, straight chain or branched chain of substituted or non-substituted $C_1$-$C_{17}$ hydrocarbon compounds which may contain at least one oxygen, nitrogen or sulfur atom.

18. The method according to claim 15, wherein the intervening linking compound is a compound selected from the group consisting of fullerene, carbon nanotube, α,ω-dialdehyde, dicarboxylic acid, dicarboxylic acid anhydride, amine-dendrimer, polyethyleneimine, α,ω-diamine, metal porphyrin and complex compounds represented by M(salan) (M is cobalt, nickel, chrome, manganese or iron; and saline is N,N'-bis(salicylidene)ethylenediamine).

19. The method according to claim 15, wherein the sonication is carried out using a sound wave having a frequency of 10 kHz-100 MHz.

20. The method according to claim 15, wherein the zeolite is one containing within its pores silver ion, sodium ion, zinc ion, copper ion, neutral dye, cationic dye, luminescent dye or compounds with sensitivity to light having a given wavelength.

21. The method according to claim 15, wherein the zeolite is selected from the group consisting of:
(i) natural and synthetic zeolites;
(ii) zeolites having MFI structure and their analogues;
(iii) zeolites having MEL structure and their analogues;
(iv) zeolites (A), X, Y, L, beta, modenite, perialite, ETS-4 and ETS-10;
(v) mesoporous silica;
(vi) zeolites and zeotype molecular sieves generated through hydrothermal synthesis;
(vii) organic-inorganic complexed mesoporous structure and laminate; and
(viii) nanoporous materials called as organic zeolite, organic metal zeolite or coordinate compound zeolite in which metal ions and ligands are combined in a three-dimension to form nanopores.

22. A method for preparing a composite of zeolite-fiber substrate, which comprises sonicating a mixture of a fiber substrate, a linking compound and a zeolite to form the composite of zeolite-linking compound-fiber substrate, wherein the method does not include a refluxing step for linking the zeolite to the fiber substrate.

23. The method according to claim 22, wherein the fiber substrate is (i) a natural fiber selected from the group consisting of cotton, kapok, linen, ramie, hemp, jute, sisal, coir, starch, lignin, sheep wool, goat hair, cashmere hair, alpaca, vicuna wool, lama wool, silk, cultivated silk and tussah silk; or (ii) a synthetic fiber selected from the group consisting of acetate-based fiber, triacetate-based fiber, polyimide fiber, polyester fiber, polyurethane fiber, polyethylene fiber, polyvinyl chloride fiber, polyvinylidene chloride fiber, polyfluoroethylene fiber, polyvinyl alcohol fiber, polyacrylo nitrile fiber and polypropylene fiber.

24. The method according to claim 22, wherein the linking compound is a compound selected from the group consisting of compounds represented by the following formulas 1-7:

| | |
|---|---|
| Z-L1-X | Formula 1 |
| MR'$_4$ | Formula 2 |
| R3Si-L1-Y | Formula 3 |
| HS-L1-X | Formula 4 |
| HS-L1-SiR$_3$ | Formula 5 |
| HS-L1-Y | Formula 6 |
| Z-L2(+)L3(−)—Y or Z-L3(−)L2(+)—Y | Formula 7 | wherein, Z is R$_3$Si or isocyanate (—NCO); R is halogen, $C_1$-$C_4$ alkoxy or $C_1$-$C_4$ alkyl and at least one of three Rs is halogen or alkoxy; L1 is a substituted or non-substituted $C_1$-$C_{17}$ alkyl, aralkyl or aryl and may contain one or more oxygen, nitrogen or sulfur atoms; X is halogen, isocyanate (—NCO), tosyl or azide; R' is halogen, $C_1$-$C_4$ alkoxy or $C_1$-$C_4$ alkyl and at least two of four R's is halogen or alkoxy; M is silicon, titanium or zirconium; Y is hydroxyl, thiol, amine, ammonium, sulfone or its salt, carboxylic acid or its salt, acid anhydride, epoxy, aldehyde, ester, acryl, isocyanate (—NCO), sugar residue, double bond, triple bond, diene, diyne, alkyl phospine, alkyl amine and ligand-exchangeable coordinate compounds and may be located at the middle position of the linking compound or at the terminus; L2(+) is a functional group having at least one positive charge in the terminus, straight chain or branched chain of substituted or non-substituted $C_1$-$C_{17}$ hydrocarbon compounds which may contain at least one oxygen, nitrogen or sulfur atom; and L3(−) is a functional group having at least one negative charge in the terminus, straight chain or branched chain of substituted or non-substituted $C_1$-$C_{17}$ hydrocarbon compounds which may contain at least one oxygen, nitrogen or sulfur atom.

25. The method according to claim 22, wherein the linking compound is a compound selected from the group consisting of fullerene, carbon nanotube, α,ω-dialdehyde, dicarboxylic acid, dicarboxylic acid anhydride, amine-dendrimer, polyethyleneimine, α,ω-diamine, metal porphyrin and complex compounds represented by M(salan) (M is cobalt, nickel, chrome, manganese or iron; and saline is N,N'-bis(salicylidene)ethylenediamine).

26. The method according to claim 22, wherein the sonication is carried out using a sound wave having a frequency of 10 kHz-100 MHz.

27. The method according to claim 22, wherein the zeolite is one containing within its pores silver ion, sodium ion, zinc ion, copper ion, neutral dye, cationic dye, luminescent dye or compounds with sensitivity to light having a given wavelength.

28. The method according to claim 22, wherein the zeolite is selected from the group consisting of:
(i) natural and synthetic zeolites;
(ii) zeolites having MFI structure and their analogues;
(iii) zeolites having MEL structure and their analogues;
(iv) zeolites (A), X, Y, L, beta, modenite, perialite, ETS-4 and ETS-10;
(v) mesoporous silica;
(vi) zeolites and zeotype molecular sieves generated through hydrothermal synthesis;
(vii) organic-inorganic complexed mesoporous structure and laminate; and
(viii) nanoporous materials called as organic zeolite, organic metal zeolite or coordinate compound zeolite in which metal ions and ligands are combined in a three-dimension to form nanopores.

29. The method according to claim 1, wherein the fiber substrate is a natural fiber or a synthetic fiber.

30. The method according to claim 8, wherein the fiber substrate is a natural fiber or a synthetic fiber.

31. The method according to claim 15, wherein the fiber substrate is a natural fiber or a synthetic fiber.

32. The method according to claim 22, wherein the fiber substrate is a natural fiber or a synthetic fiber.

33. The method according to claim 2, wherein the starch is amylase or amylopectin.

34. The method according to claim 9, wherein the starch is amylase or amylopectin.

35. The method according to claim 16, wherein the starch is amylase or amylopectin.

36. The method according to claim 23, wherein the starch is amylase or amylopectin.

37. The method according to claim 4, wherein the fullerene is $C_{60}$ or $C_{70}$.

38. The method according to claim 11, wherein the fullerene is $C_{60}$ or $C_{70}$.

39. The method according to claim 18, wherein the fullerene is $C_{60}$ or $C_{70}$.

40. The method according to claim 25, wherein the fullerene is $C_{60}$ or $C_{70}$.

* * * * *